(12) United States Patent
Kanji et al.

(10) Patent No.: US 7,454,729 B1
(45) Date of Patent: Nov. 18, 2008

(54) METHOD AND SYSTEM FOR VALIDATING TESTBENCH

(75) Inventors: Fiyaz Kanji, San Jose, CA (US); Albert Chang, Fremont, CA (US)

(73) Assignee: Altera Corporation, San Jose, CA (US)

( * ) Notice: Subject to any disclaimer, the term of this patent is extended or adjusted under 35 U.S.C. 154(b) by 273 days.

(21) Appl. No.: 11/281,178

(22) Filed: Nov. 16, 2005

(51) Int. Cl.
*G06F 17/50* (2006.01)

(52) U.S. Cl. .............................................. 716/6; 716/4

(58) Field of Classification Search .................. 716/4–6
See application file for complete search history.

(56) References Cited

U.S. PATENT DOCUMENTS

| | | | |
|---|---|---|---|
| 5,768,159 A * | 6/1998 | Belkadi et al. | 703/19 |
| 6,393,600 B1 * | 5/2002 | Sribhashyam et al. | 716/1 |
| 2004/0230933 A1 * | 11/2004 | Weaver et al. | 716/12 |
| 2005/0144585 A1 * | 6/2005 | Daw et al. | 716/18 |
| 2005/0198597 A1 * | 9/2005 | Zhu et al. | 716/4 |
| 2005/0268265 A1 * | 12/2005 | Ly et al. | 716/6 |
| 2006/0190871 A1 * | 8/2006 | Likovich et al. | 716/5 |
| 2007/0229121 A1 * | 10/2007 | Mouttet | 327/100 |

* cited by examiner

*Primary Examiner*—Stacy A Whitmore
(74) *Attorney, Agent, or Firm*—Martine Penilla & Gencarella, LLP (57) ABSTRACT

A method for validating timing violations in a testbench is provided. The method includes obtaining the timing requirements for a design under test from a first file. The timing requirements for the design may be entered as an input to a verification tool. Then, based on the timing requirements of the user, a place and route operation is performed resulting in a design layout. Following the place and route operation, timing results are obtained for the design layout. The timing results may be obtained through simulation. From the timing results, timing values are extracted at the input level so that the inputs may be driven based on those timing values. The timing values compensate for any timing violations that may have resulted from the timing models of the verification tool.

19 Claims, 6 Drawing Sheets

METHOD AND SYSTEM FOR VALIDATING TESTBENCH

DESCRIPTION OF THE RELATED ART

The integrated circuits today include complex hardware designs. One of the challenges for design engineers is to ensure that the different circuits included in the design function as intended. More specifically, with regards to timing violations, it is hard to determine which one of the inputs is the cause of the violation. Tracing back from the point where the violation occurred is one way to determine the violation. However, today's circuits are of considerable size with a large number of combinatorial logic layers. Therefore, tracing back through the circuits to determine the input which may have caused the violation, is time consuming.

There are different verification tools, available today, that are capable of simulating the design. Design engineers generally develop and test their design using these verification tools. In order to run the simulations, the design engineers may use a testbench that mimics real life situations to test their design developed using the verification tools. However, during a simulation, when there are timing violations, it is hard to determine whether the violations are caused by a flaw in the testbench or the timing models provided to the verification tool.

Accordingly, there exists a need for a system and a method for determining whether the timing violations were caused by a defect in the testbench or in the timing models given that a static timing analysis passed.

SUMMARY

Broadly speaking, the present invention fills these needs by providing a method and system for checking the testbench prior to the simulation runs of the design. The embodiments described herein are capable of validating the signals at the input pin level because the checks are performed at the input pin level so that a determination can be made at the outset whether the violation was caused by the testbench.

In one aspect of the invention, a method for validating timing violations in a testbench is provided. The method includes obtaining the timing requirements for a design under test from a first file. The timing requirements for the design may be entered as an input to a verification tool. Then, based on the timing requirements of the user, a place and route operation is performed resulting in a design layout. The design layout illustrates the placement of the design logic into the integrated circuit subsequent to the routing of the design using the available routing resources. Following the place and route operation, timing results are obtained for the layout of the design. From the timing results, timing values are extracted at the input level so that the inputs may be driven based on the design layout timing values.

In another embodiment, the above described operations may be embodied on a computer readable medium having program instructions for performing the functionality of the method operations.

In another aspect of the invention, a computing system for determining timing violations in a testbench is provided. The computing system includes a processor and a memory in communication with the processor. The memory includes program instructions to be executed by the processor. The program instructions causing the processor to perform the following the operations. The operations include obtaining the timing requirements of a design under test from a first file. Based on the timing requirements, place and route operations are performed, which results in a design layout. Thereafter, timing results are obtained for the design layout through simulation. From the timing results, timing components are automatically extracted and the timing values are calculated using the timing components. The timing values are used to drive the input pin.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention for automatically checking flaws within a testbench is provided. The embodiments of the present invention described herein perform the check at the individual input pin level so the source of the violation can be readily determined. Checks are performed for each individual input pin using duplicate registers that are not connected to your design.

Figure 1:
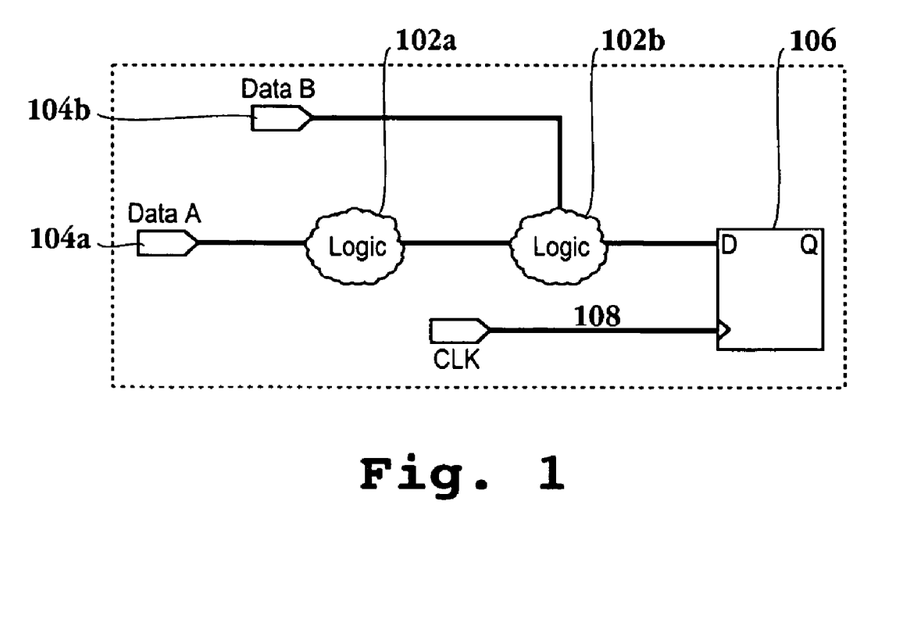
FIG. 1 is a high level diagram of an integrated circuit (IC) in accordance with an embodiment of the present invention.

FIG. 1 shows an integrated circuit (IC). The IC includes input pins 104a and 104b, combinatorial logics 102a and 102b, register 106 and clock 108. Data from input pin 104a are received by combinatorial logic 102a and data from input pin 104b are received by combinatorial logic 102b. Combinatorial logic 102b also receives the output of combinatorial logic 102a. One skilled in the art should understand that combinatorial logic 102a and 102b may have several layers of circuit elements. For example, the circuit elements may include different types of gates, inverters, buffers etc. Thus, when an error, such as a timing error, occurs at register 106, determining the input pin which caused the error, through tracing, can be time consuming due to the multiple input pins and layers of logic associated with the error.

Figure 2:
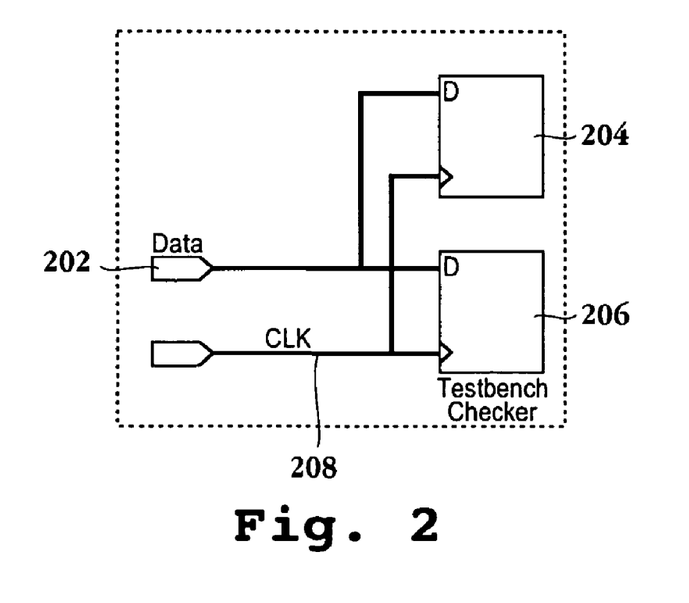
FIG. 2 is a high level schematic of the testbench checker in accordance with an embodiment of the present invention.

FIG. 2 is a high level schematic of the testbench checker in accordance with an embodiment of the present invention. FIG. 2 includes input pin 202, and clock 208, registers 204 and 206. As can be seen, input pin 202 is connected to registers 204 and 206. The timing verifications are performed at input pin level 202 using duplicate register 204. Since the timing verifications can be performed individually for each input pin, the input pin which causes the timing violations can be easily identified. The details of the actual process of conducting the check will be described below.

Figure 3A:
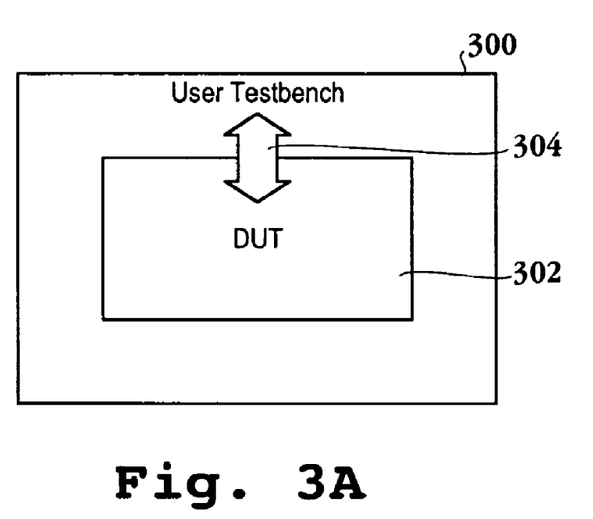
FIG. 3a shows a schematic of a user testbench interacting with a design under test (DUT) in accordance with an embodiment of the present invention.
Figure 3B:
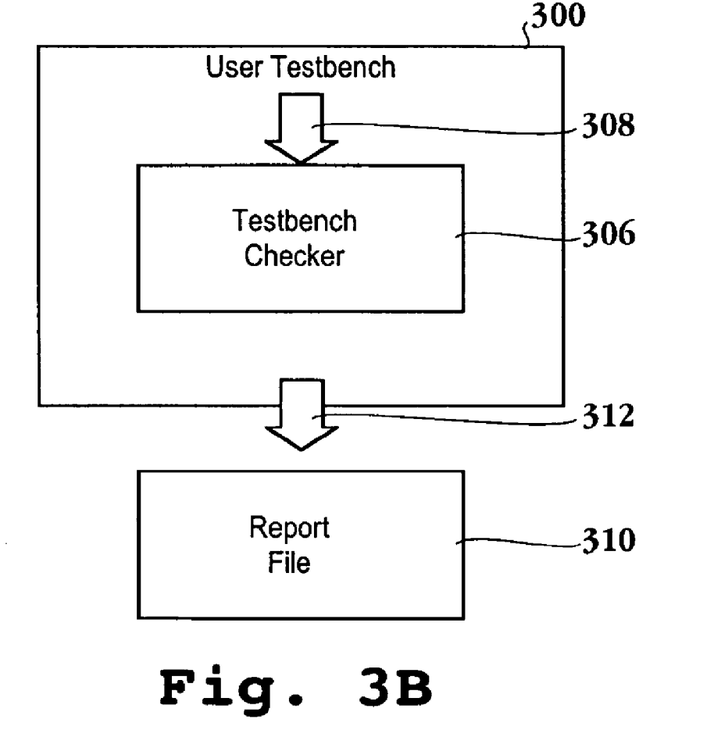
FIG. 3b shows a schematic of a user testbench interacting with a testbench checker wrapper file in accordance with an embodiment of the invention.

FIG. 3a shows a schematic of a user testbench interacting with a design under test (DUT) in accordance with an embodiment of the present invention. FIG. 3a includes a user testbench 300 and DUT 302. The user testbench 300 interacts with DUT 302 as indicated by arrow 304. For example, a timing simulation may be run with user testbench 300 interacting with DUT 302 and timing results may be obtained from the simulation run. From the timing results, the timing requirements are determined. In FIG. 3b, DUT 302 is replaced with testbench checker wrapper file 306 and the simulation may be run again. In one embodiment, the testbench checker wrapper file 306 contains a number of dummy registers, which are used to verify the user testbench 300. From the simulation run using the dummy registers, a determination is made as to whether the timing requirements are met. If the timing requirements are not met, it is understood that the error is caused by the user testbench 300 and is not caused by the timing models i.e., the simulation of the actual design, because this testing model does not contain the actual design. Further shown in FIG. 3b is a report file 310, which shows in detail the results of the simulation run. Report file 310 provides a detailed summary of the timing analysis for each of the elements (not shown) in the design. From the detailed summary, design engineers can determine the amount of adjustment that needs to be made at the input pin level in order to synchronize the data signal with the clock signal.

Exemplary functions for the testbench checker and the testbench checker wrapper file are provided below in Table 1. Table 1 shows a user testbench file on the left column and testbench checker wrapper file in the right column. On the left side the statement "module my_testbench( )" instantiates the testbench. Next, "timing_check t0(.dffin(dffin), .clk(~clk))" instantiates a new module called "timing_checkt$_0$" and provide all the inputs to "dffin". This command also connects the testbench to the source file. In one embodiment the source files are the users design files that contain the gate-level timing netlist which may be generated using software. On the right side in Table 1, the timing requirements are extracted from the timing results provided by the simulation tool. Once the timing requirements are extracted, various Verilog constructs are built. One example of such a construct is "setuphold_test s0(.clk(clk), .datain(dffin), .dataout( ))". This exemplary Verilog construct performs various timing checks. For example, this exemplary construct verifies whether the setup time requirements of the user match the setup time requirement provided by the simulation tool. The timing requirements are imported into the testbench checker wrapper file through construct "$sdf_annotate("timing_package.sdo")". The "timing_package.sdo" contains all the timing requirements, such as the setup time, hold time, etc., for the dummy registers.

TABLE 1

| User Testbench | Testbench Checker Wrapper File |
|---|---|
| 'timescale 1ns/1ns | module timing_check (clk, dffin); |
| | input clk; |
| module_mytestbench( ); | input dffin; |
| : | |
| : | initial $sdf_annotate("timing_package.sdo"); |
| : | setuphold_test s0(.clk(clk), .datain(dffin), |

TABLE 1-continued

| User Testbench | Testbench Checker Wrapper File |
|---|---|
| | .dataout( )); |
| timing_check | |
| t0(.dffin(dffin), | |
| .clk(~clk)); | |
| //here is where you instantiate your design | |
| | endmodule |
| endmodule | |

Figure 4:
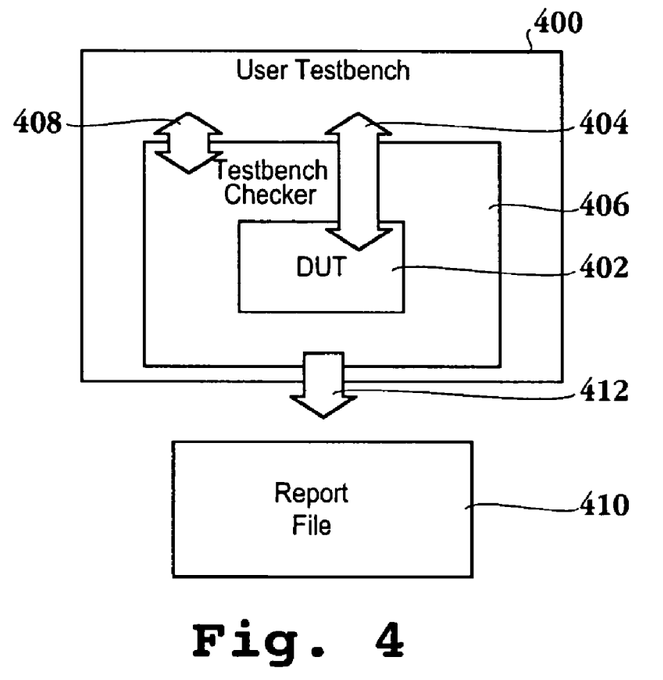
FIG. 4 shows another schematic of a user testbench interacting with a DUT in accordance with an embodiment of the present invention.

FIG. 4 shows another schematic of a user testbench interacting with a DUT in accordance with an embodiment of the present invention. In FIG. 4, the test may be conducted by including the design into the test. This model is particularly useful for more complex testbenches that include self-checking logic or output dependent stimulus generators. One example of such a scenario would be a cumulative adder where each new input is added to the previous result to get a cumulative sum. Like the previous design, described in FIGS. 3a and 3b, the testbench does not change the functionality or the timing of the design. FIG. 4 includes user testbench 400, testbench checker wrapper file 406, DUT 402, and report file 410. In this design, a testbench checker wrapper file 406 is designed around DUT 402. The testbench checker wrapper file 406 is placed as an invisible wrapper between user testbench 400 and DUT 402. The testbench checker wrapper file 406 will not interfere in the path between user testbench 400 and DUT 402 because testbench checker wrapper file 406 is transparent. The user testbench 400 communicates directly with the testbench checker wrapper file 406 and DUT 402. Therefore, there is no delay in communication between the user testbench 400 and DUT 402. One skilled in the art may think of this as a zero delay wire that is split to both testbench checker wrapper file 406 and the DUT 402. Exemplary functions, for the model described above with respect to FIG. 4, are provided below in Table 2.

In Table 2, a timing package is provided on the left side and a standard delay output (SDO) file on the right. The "setuphold_test s0(.clk(clk), .datain(dffin), .dataout( ))" module that was shown in Table 1 is being used here to verify whether the setup time requirements match what was provided by the simulation tool. The setuphold_test described herein is developed for each and every single input pin in the design. Thus, the setuphold_test will indicate which input pin caused the timing violation at the destination register. The dummy registers are instantiated here to verify the timing requirements are met at the input pin level. Also in Table 2, the delays between the individual circuit elements are extracted from the timing results of the simulation tool and each delay is added with the next one to obtain a sum delay at the input pin level.

The SDO file shown in Table 2 is a new SDO file generated using the timing values from an old SDO file. The old SDO file contains the IC timing information and the simulation tool uses this information. Therefore, when the simulation is run, the simulation tool analyzes the design, generates the timing numbers, and builds a new SDO file that has the delay constructs and the dummy registers built in. This new SDO file is used with the timing check Verilog file. The timing check Verilog file contains timing models for the input pin, clock and the timing values. The timing numbers for the dummy registers are used from the new SDO file. Even though the present invention is described in terms of setup time, one skilled in the art should understand that the embodiments described herein may be used to determine the input pin that might have caused other types of timing violations such as hold time (Thold), clock out (Tco), maximum frequency (Fmax), etc. However, a separate module must be instantiated for each of the different types of timing violations. For example, to verify a clock out time violation, a "module TCO_test" may be instantiated. One skilled in the art should understand that even though the SDO file refers to "Altera" and "Quartus" as examples, other types of vendors and simulation tools may be used here.

TABLE 2

| Timing Package | SDO File |
|---|---|
| module setuphold_test(clk, datain, dataout);<br>:<br>:<br>   specify<br>      $setuphold(posedge clk, datain, 0,0):<br>   endspecify<br><br>   always@(posedge clk)<br>      dataout <= datain;<br>endmodule | (DELAYFILE<br>(SDFVERSION "2.1")<br>(DESIGN "timing_check")<br>(DATE "11/24/200315:33:37")<br>(VENDOR "Altera")<br>(PROGRAM "Quartus II")<br>(VERSION "Version 4.0 Internal<br>Build 155 11/09/2003 SJ Full<br>Version")<br>(DIVIDER.)<br>(TIMESCALE 1 ps)<br>(CELL<br>(CELLTYPE "setuphold_test")<br>(INSTANCE s0)<br>(DELAY<br>   (ABSOLUTE<br>      (PORT datain (0:0:0) (0:0:0))<br>         (PORT clk (0:0:0) (0:0:0))<br>   )<br>)<br>(TIMINGCHECK<br>   (SETUP datain (posedge clk)<br>   (9900:9900:9900))<br>   (HOLD datain (posedge clk)<br>   (9900:9900:9900))<br>)<br>)<br>) |

Figure 5:
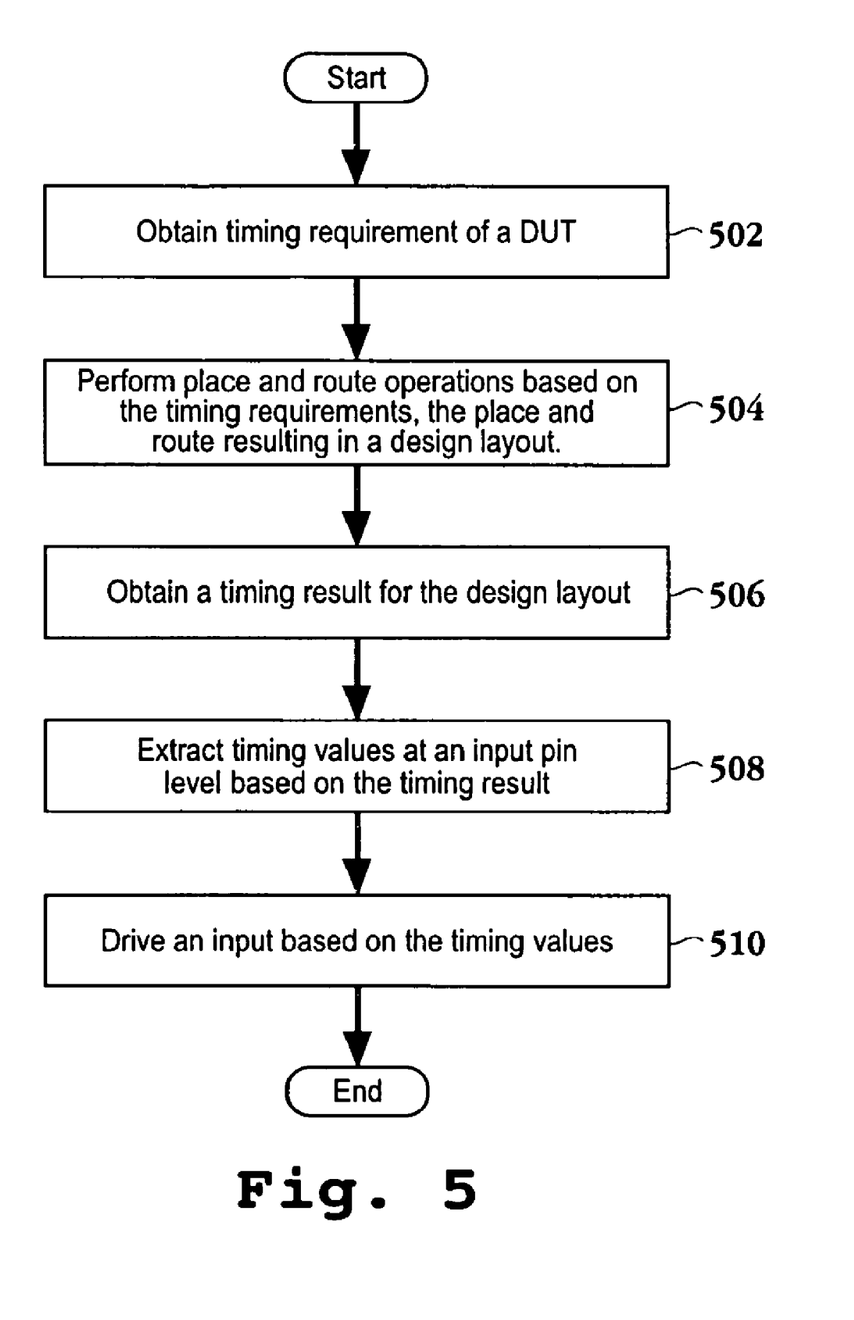
FIG. 5 is a flow chart illustrating the method of operations involved in performing checks for each individual input pin, using duplicate registers, in accordance with an embodiment of the present invention.

FIG. 5 is a flow chart illustrating the method of operations involved in performing checks for each individual input pin, using duplicate registers, in accordance with an embodiment of the present invention. The method begins with operation 502, where a timing requirement for a DUT is obtained from a first file. As described above, the first file may be the old SDO file. When a user develops an IC design, the user tests the design through simulation tools e.g. the QUARTUS™ tool available from the assignee. One skilled in the art should understand that the method described herein is not limited to QUARTUS, it may be used with other available simulation tools. The user may enter the timing requirements for the IC design into the simulation tool. Based on the timing requirement, a place and route operation is performed in operation 504. Place and route operation results in a design layout. Once the place and route operation is complete, the design is verified by running a simulation of the design layout using a testbench. The timing result for the design layout is obtained in operation 506.

The timing result obtained from the output of the simulation tools includes the timing components for the individual circuit elements but not necessarily the total of the timing components at the input pin level. Accordingly, in operation 508, the embodiments of the present invention, extract the timing components for the individual circuit elements, such as the registers, from the timing result, and calculate the timing value at the input pin level. In one embodiment, the timing report is parsed to extract the timing component for each individual circuit element. In another embodiment, a script is used to determine and provide the timing component at each circuit node in the design. The timing component may be the setup time or the hold time for the individual circuit elements. The timing result also shows whether the timing requirements are met. If the timing requirements are not met, then the embodiment described herein calculates the difference between the timing results and the timing requirements and includes the difference in the timing value. In one embodiment, an output file is generated with the timing value. From the generated file, the values required to drive the input pin may be obtained as needed. Then, in operation 508, the input pin is driven using the calculated values.

Once the difference in between the timing result and the timing requirements are obtained, the testbench checker wrapper file described above is used to determine whether the difference is compensated at the input pin level. As described above, the testbench checker wrapper file introduces dummy registers which are connected directly to the input pin and the clock. The dummy registers are used to test whether the difference between the timing result and the timing requirement shown in the timing value is compensated for at the input pin level. If the value is not compensated at the input pin level, one skilled in the art will understand that the testbench is the cause of the problem and not the timing models for the simulation tool.

Figure 6:
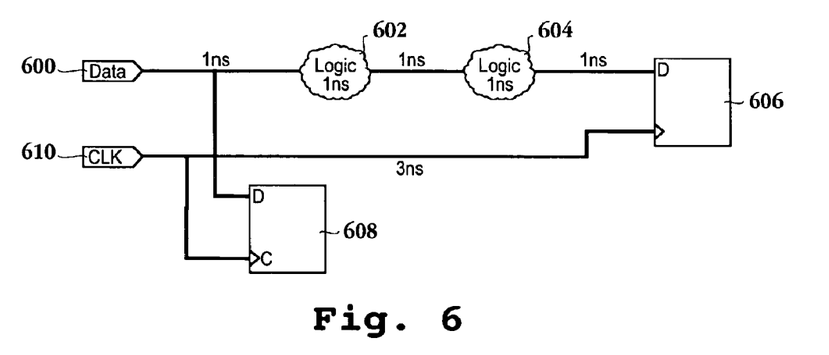
FIG. 6 further illustrates, by way of example, the method described above with respect to FIG. 5 in accordance with an embodiment of the present invention.

FIG. 6 is a simplified schematic diagram illustrating by way of example the method described above with respect to FIG. 5, in accordance with an embodiment of the present invention. FIG. 6 shows data pin 600, clock 610, combinatorial logics 602 and 604, register 606, and dummy register 608. As shown there is a 1 nano second (ns) path delay between data pin 600 and combinatorial logic 602, combinatorial logic 602 and combinatorial logic 604, and combinatorial logic 604 and register 606. Each of the combinatorial logics 602 and 604 too have a 1ns delay associated with them. In addition, there is a 3 ns path delay between clock 610 and the register

606. According to the present example, there is a total path delay of 5 ns between the input pin 600 and register 606, which is obtained by adding the individual delays in the path. If a simulation is run as described above, the timing report will indicate that the timing requirements are not met. The timing requirements are not met because there is a 2 ns difference in the path delay between the input pin 600 to register 606 and clock 610 to register 606. In other words, the clock signal reaches the register 606 2 ns prior to the data signal. Even though the timing result will flag an error and show the individual delays in the path, i.e., 1 ns between each circuit element, the result will not show the total delay in the path i.e. 5 ns.

Therefore, the present invention will extract the individual delay values and calculate the total delay between the input pin 600 and register 606 and subtract the path delay for the clock 610 to determine the actual delay requirement with respect to the input pin. Subsequently, when the timing simulation is done with the testbench, the dummy register 608 is connected to the input pin 600 and the clock 610. According to the timing value, calculated above, the clock signal must arrive at register 608, 2 ns later than the data signal from the data pin 600. Otherwise, there will be a timing violation at register 606. Therefore, if the user creates the testbench without taking the 2 ns set up time into consideration there will be a timing violation during a gate level simulation. As can be seen, the present invention allows the check to be performed at each input pin level, which in turn saves time.

The method and system, described herein may be used to check the testbench prior to simulations with any IC. The IC for example, may be programmable logic devices such as field programmable gate array (FPGA), programmable array logic (PAL), programmable logic array (PLA), field programmable logic array (FPLA), electrically programmable logic devices (EPLD), electrically erasable programmable logic device (EEPLD), logic cell array (LCA), just to name a few. The programmable logic device may be a part of a data processing system that includes one or more of the following components: a processor, memory, I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operations, unless explicitly stated in the claims.

What is claimed is:

1. A method for validating timing violations in a testbench comprising:
    obtaining timing requirements of a design under test from a first file;
    performing a place and route operations based on the timing requirements, the place and route operation resulting in a design layout;
    obtaining timing results for the design layout;
    extracting timing values with respect to an input pin level from the timing results, the extracting including introducing a dummy register into a testbench checker wrapper file, wherein the dummy register is capable of receiving a data signal and a clock signal directly from an input pin and a clock, respectively; and
    driving an input for the input pin based on the timing values.

2. The method of validating timing violations of claim 1, further comprising:
    testing the test bench by sending the data signal and the clock signal to the dummy register directly from the input pin and the clock respectively.

3. The method of validating timing violations of claim 2, wherein the process of testing includes,
    the testbench communicating directly with the testbench checker wrapper file.

4. The method of validating timing violations of claim 1, further comprising:
    conducting a simulation run using a simulation tool;
    obtaining the timing results from an output of the simulation tool; and
    generating a path delay for a data path by summing timing components, obtained from the timing results for individual circuit elements in the design layout, wherein the data path starts at the input pin and ends at a destination register.

5. The method of validating timing violations of claim 4, wherein the process of generating timing values for the data path includes,
    finding a difference between the path delay and a clock delay at the destination register; and
    storing the difference in a second file.

6. The method of validating timing violations of claim 5, further comprising:
    obtaining the difference from the second file; and
    using the difference to test the testbench by utilizing the dummy register.

7. The method of validating timing violations of claim 6, further comprising:
    compensating for the difference at the input pin.

8. The method of validating timing violations of claim 1, wherein the process of obtaining timing results includes, the testbench communicating directly with the design under test.

9. A computing system for determining timing violations in a testbench comprising:
- a processor; and
- a memory in communication with the processor over a bus, the memory includes program instructions to be executed by the processor, the program instructions causing the processor to perform a method comprising:
  - obtaining timing requirements of a design under test from a first file;
  - performing place and route operations based on the timing requirements, the place and route operation resulting in a design layout;
  - obtaining timing results following the place and route for the design layout;
  - automatically extracting timing components from the timing results;
  - calculating timing values at an input pin level from the timing components, the calculating including introducing a dummy register into a testbench checker wrapper file, wherein the dummy register is capable of receiving a data signal and a clock signal directly from an input pin and a clock, respectively; and
  - driving an input for the input pin based on the timing values.

10. The computing system of claim 9 wherein the timing requirements are stored in a first file.

11. The computing system of claim 10, wherein the timing values are stored in a second file.

12. The computing system of claim 11, wherein the timing results are obtained from an output of a simulation tool.

13. The computing system of claim 10, wherein the timing values compensate for a time difference between the input signal and the clock signal to the dummy register.

14. The computing system of claim 10, wherein the timing values are calculated based on a difference in arrival time at a destination register of a data signal and a clock signal from an input pin and a clock, respectively.

15. A computer program embodied on a computer readable medium for validating violations in a testbench comprising:
- a code segment for obtaining timing requirements from a first file;
- a code segment for performing place and route operation of circuit elements based on the timing requirements resulting in a design layout;
- a code segment for obtaining timing results of the design layout from an output of a simulation tool;
- a code segment for extracting timing components from the timing results;
- a code segment for deriving timing values from the timing components for an input pin, the code segment for deriving including a code segment for introducing a dummy register into a testbench checker wrapper file, wherein the dummy register is capable of receiving a data signal and a clock signal directly from the input pin and a clock, respectively; and
- a code segment for driving the input pin based on the timing value.

16. The computer program of claim 15, wherein timing values are derived by summing the timing components.

17. The computer program of claim 15, further includes a code segment for determining a difference between the timing value and a clock signal at the destination register.

18. The computer program of claim 17, further includes code segment for compensating the difference between the timing value and a clock signal at the input pin.

19. The computer program of claim 18, further includes a code segment for storing the timing value in a second file.

* * * * *